INVENTOR.
Thomas L. Loposer
BY
Robert M. Sperry

INVENTOR.
Thomas L. Loposer
BY Robert M. Sperry

INVENTOR.
Thomas L. Loposer
BY
Robert M. Sperry

Nov. 14, 1967 T. L. LOPOSER 3,353,104
FREQUENCY SYNTHESIZER USING FRACTIONAL DIVISION BY
DIGITAL TECHNIQUES WITHIN A PHASE-LOCKED LOOP
Original Filed Oct. 2, 1963 6 Sheets-Sheet 4

INVENTOR.
Thomas L. Loposer
BY Robert M. Sperry

Nov. 14, 1967 T. L. LOPOSER 3,353,104

FREQUENCY SYNTHESIZER USING FRACTIONAL DIVISION BY DIGITAL TECHNIQUES WITHIN A PHASE-LOCKED LOOP

Original Filed Oct. 2, 1963 6 Sheets-Sheet 5

INVENTOR
Thomas L. Loposer
BY Robert M. Sperry

Nov. 14, 1967 T. L. LOPOSER 3,353,104

FREQUENCY SYNTHESIZER USING FRACTIONAL DIVISION BY DIGITAL TECHNIQUES WITHIN A PHASE-LOCKED LOOP

Original Filed Oct. 2, 1963 6 Sheets-Sheet 6

INVENTOR
Thomas L. Loposer
BY
Robert M. Sperry

United States Patent Office 3,353,104

Patented Nov. 14, 1967

3,353,104

FREQUENCY SYNTHESIZER USING FRACTIONAL DIVISION BY DIGITAL TECHNIQUES WITHIN A PHASE-LOCKED LOOP

Thomas L. Loposer, Dallas, Tex., assignor to LTV Electrosystems, Inc., Dallas, Tex., a corporation of Delaware Original application Oct. 2, 1963, Ser. No. 313,346, now Patent No. 3,217,267, dated Nov. 9, 1965. Divided and this application June 14, 1965, Ser. No. 463,532

8 Claims. (Cl. 328—39)

ABSTRACT OF THE DISCLOSURE

This invention relates to frequency synthesizing means wherein the output of a voltage-controlled oscillator is divided by a digital divider and the divider output is phase-matched with a reference frequency to provide a control signal for tuning the voltage-controlled oscillator.

The present invention relates to frequency synthesizers in general, and more particularly to frequency synthesizers using digital techniques for fractional division within a phase-locked loop. This application is a division of my co-pending application Ser. No. 313,346, filed Oct. 2, 1963, and issued November 9, 1965 as Patent No. 3,217,267, entitled "Frequency Synthesis Using Fractional Division By Digital Techniques Within A Phase-Locked Loop."

Techniques used for obtaining frequency synthesis based on a single, ultra-stable oscillator, in which there is created by multiplication a spectrum of frequencies from the stable oscillator frequency and in which there is locked to one of the spectrum lines a variable frequency oscillator, have provided greater stability than could economically be built by using many crystal oscillators of different frequencies and using various combinations thereof. In this approach, the spectrum generator output is rich in harmonics (i.e., it yields a multi-frequency output where every multiple of the input stable frequency is present). The variable frequency oscillator is then tuned by a course control, normally a voltage, until its frequency is close to the desired output, the desired output being a multiple of the frequency of the stable oscillator. A frequency or phase comparator is used to compare the desired output frequency to the multiplied frequency from the spectrum generator and a correcting voltage is supplied to pull the variable frequency oscillator into phase lock with the true frequency generated by the spectrum generator. This approach works very well in that it supplies an output which is phase-locked to a multiple of the stable frequency and, therefore, exhibits the same long term stability as the stable source. It should be noted, however, that the variable frequency oscillator used to provide the output must be set by a course control to approximately the correct frequency, that being a multiple of the stable oscillator frequency, in order to achieve phase-lock. If the coarse control sets the output of the variable frequency oscillator close to a different multiple of the basic frequency, the loop will lock onto that frequency, since it is also present in the spectrum generator output. It follows, then, that as the channel spacing is reduced and the channel frequencies are moved closer together, the demands on the open loop setting of the variable frequency oscillator coarse control become more demanding. The limiting channel spacing is, of course, a function of the frequency at which the variable frequency oscillator operates, namely, a function of the linearity of the tuning control. To illustrate, a tuning linearity of 1% is generally not too difficult to achieve, but with greater tuning accuracies, cost and complexity increase rapidly. Assuming a 1% tuning accuracy, a 1 mc. variable frequency oscillator may be set to a given frequency plus or minus 10 kc., while a 100 mc. variable frequency oscillator may only be controlled to plus or minus 1 mc. This represents a very real limitation in establishing close channel spacing.

The present invention provides a system that is, in one aspect, the reverse of the spectrum locking approach discussed above. Instead of multiplying the stable reference frequency up to the variable frequency oscillator frequency to achieve phase-lock, the output of the variable frequency oscillator is divided down to the reference frequency and phase-lock is achieved at this lower frequency. This approach is advantageous because of the fundamental fact that selective frequency multipliers are not achievable, while selective dividers are. That is to say, when frequencies are multiplied, there is obtained not one multiple of the input frequency as an output but rather all multiples. This leads to the problem discussed above of directing the variable frequency oscillator loop to the proper multiple. By dividing down, however, and obtaining a single sub-harmonic of the input frequency of an output, the problem of directing the variable frequency oscillator loop to the proper multiple is eliminated. To obtain a different sub-harmonic of an output, only the divide ratio need be changed. After the frequency of the variable frequency oscillator is divided down to the frequency of the standard, the two frequencies are compared in phase by a phase discriminator to produce a voltage proportional to any phase difference. This voltage, in turn, is fed back to the variable frequency oscillator as an error signal, where the output of the oscillator is controlled and corrected by this voltage. Thus phase-lock is achieved in the system of this invention by division within the loop.

The system just described solves, quite adequately, the problem mentioned earlier of locking in at the proper frequency. If, however, only division by whole integers is used, the system is limited in certain aspects. One limitation on such a system is the minimum channel spacing achievable with any given standard frequency. Thus, for example, if a 2–32 megacycle output channelized in 100 cycle per second steps is desired, and a 1000 c.p.s. standard frequency is used, the minimum number of cycles per second obtainable between adjacent output frequencies would be 1000 by using whole integer division, since this is the lowest common denominator of all of the output frequencies. It can be quite readily be seen, then, that the 100 c.p.s. steps in frequency output cannot be obtained with such a system. It is, therefore, a broad object of this invention to provide a frequency synthesizer system using the concept of division within a phase-locked loop to achieve a series of selected output frequencies in which any number of cycles per second separation between adjacent output frequencies can be obtained.

Another disadvantage of using only whole integer division is the filtering of the error voltage required when fed back to correct the output frequency. That is, because of the digital techniques used in the division function, as will be described hereinafter, the output of the phase discriminator in a series of pulses at a repetition rate of the reference frequency. Filtering of this series of pulses is required in order to provide a D.C. error voltage to the variable frequency oscillator. Since the desired output frequency is normally much higher (several orders of magnitude) than the standard frequency, the output frequency will contain undesirable sideband energy unless there is adequate filtering of the phase discriminator output. It is well known that the lower the frequency which must be eliminated by filtering, the larger and more elaborate the filter. It can therefore be seen that filtering at frequencies as low as the standard frequency and at virtually all higher frequencies is required when whole integer division is used. This invention is also directed toward achieving the object of a reduction of the filtering requirements imposed on such a system.

The invention comprises a system that utilizes the concept of fractional division by digital techniques rather than whole integer division only to achieve phase-lock with a loop. The frequency of a variable frequency oscillator is divided down to a standard frequency by a fractional divider using digital techniques, compared with the standard frequency within a phase discriminator, and an error voltage proportional to any phase difference, derived from the discriminator, is fed back to the oscillator to correct the output frequency thereof to the desired multiple of the standard frequency. Among the many objects and advantages achieved by this system are those enumerated above, in addition to others, all of which will become apparent from the following detailed description when taken in conjunction with the appended claims and the attached drawing in which like reference numerals refer to like parts throughout the several figures, and in which:

Figure 9A:
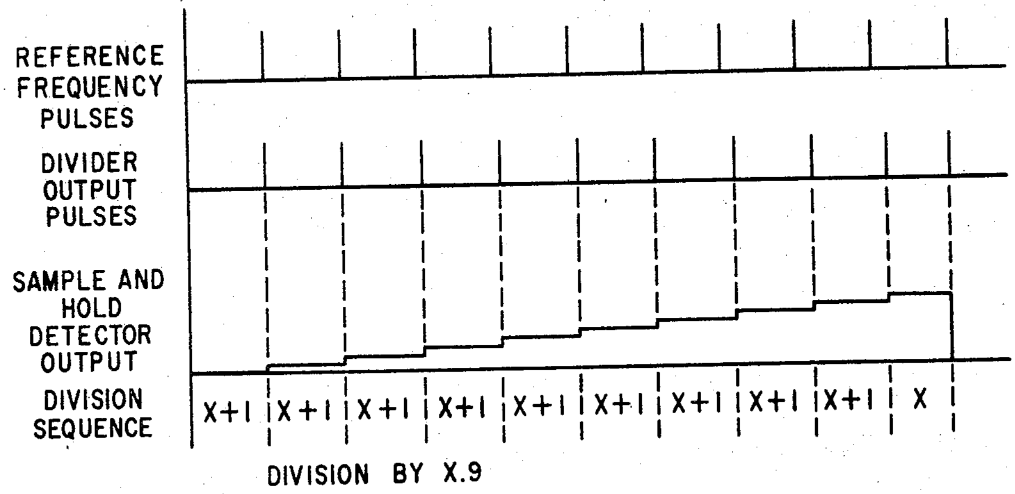
Figure 10:
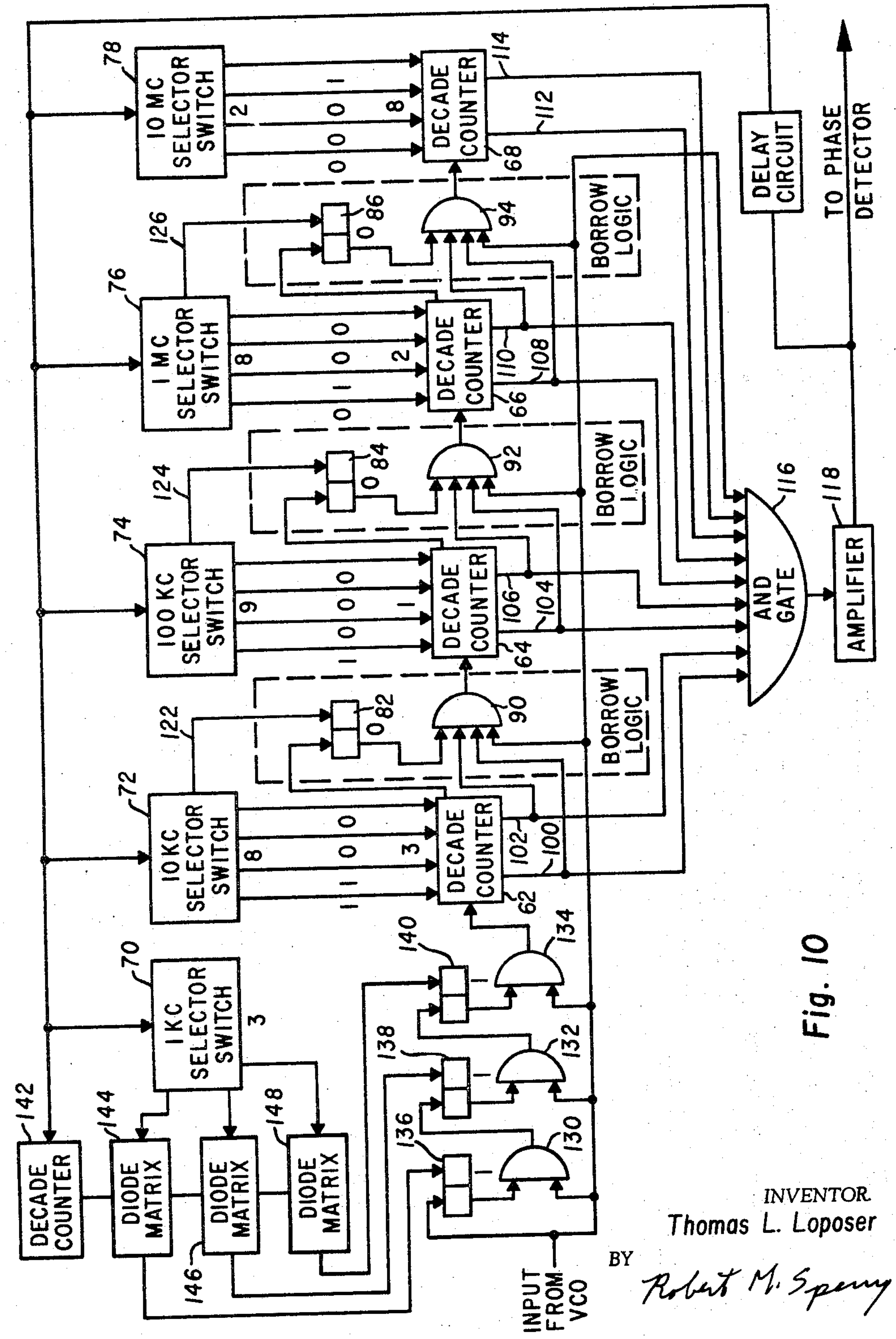
Figure 11:
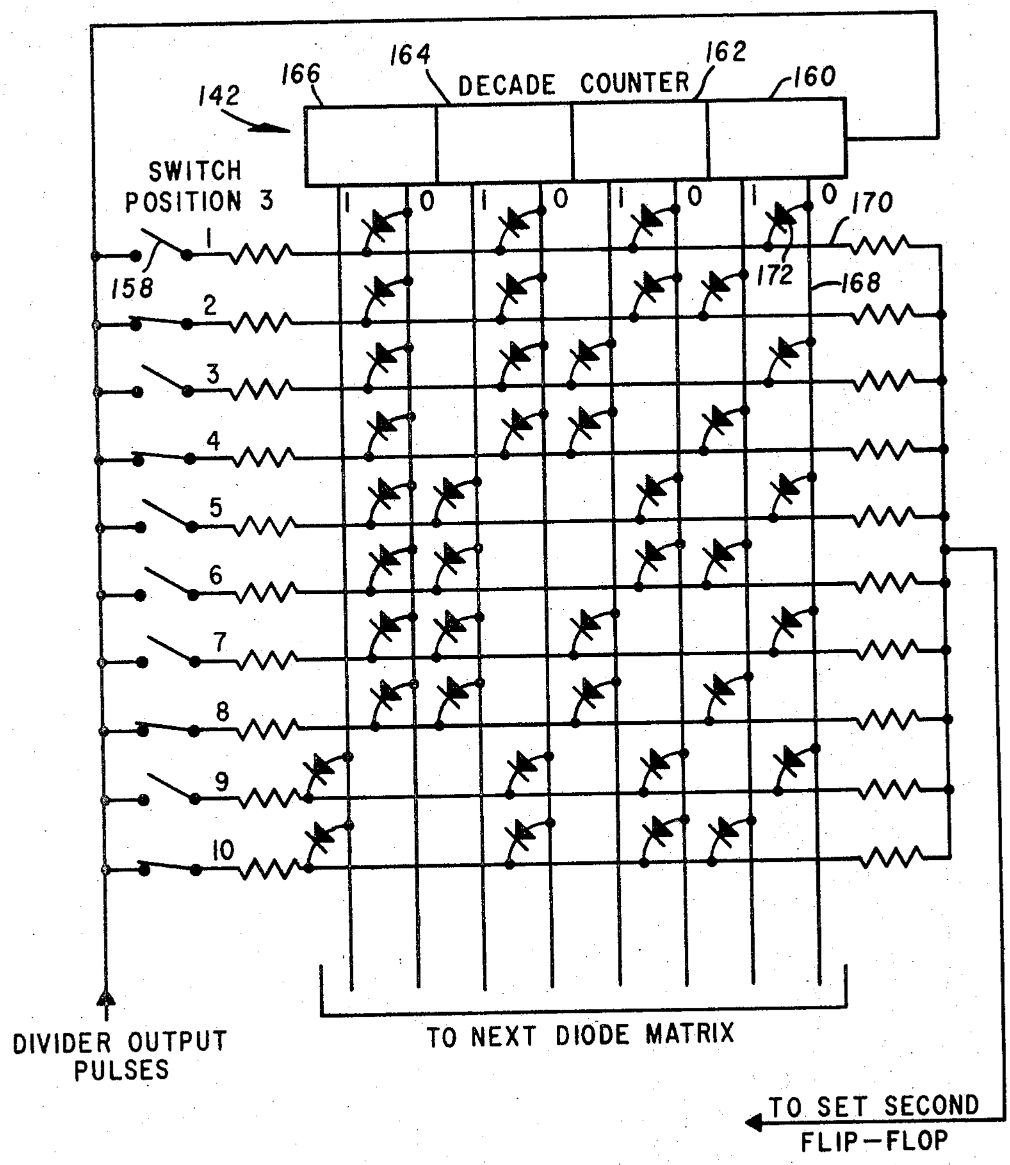

FIGURES 9*a*, *b* and *c* are a graphical representation of the standard frequency output waveforms, the divider output waveforms and sample and hold detector output waveforms illustrating fractional division within the loop by using digital techniques;

FIGURE 10 is a block diagram of a digital divider circuit capable of performing fractional division; and FIGURE 11 is a schematic of a diode matrix logic circuit used in conjunction with the fractional divider of FIGURE 10.

Figures 1, 2, 3, 4:
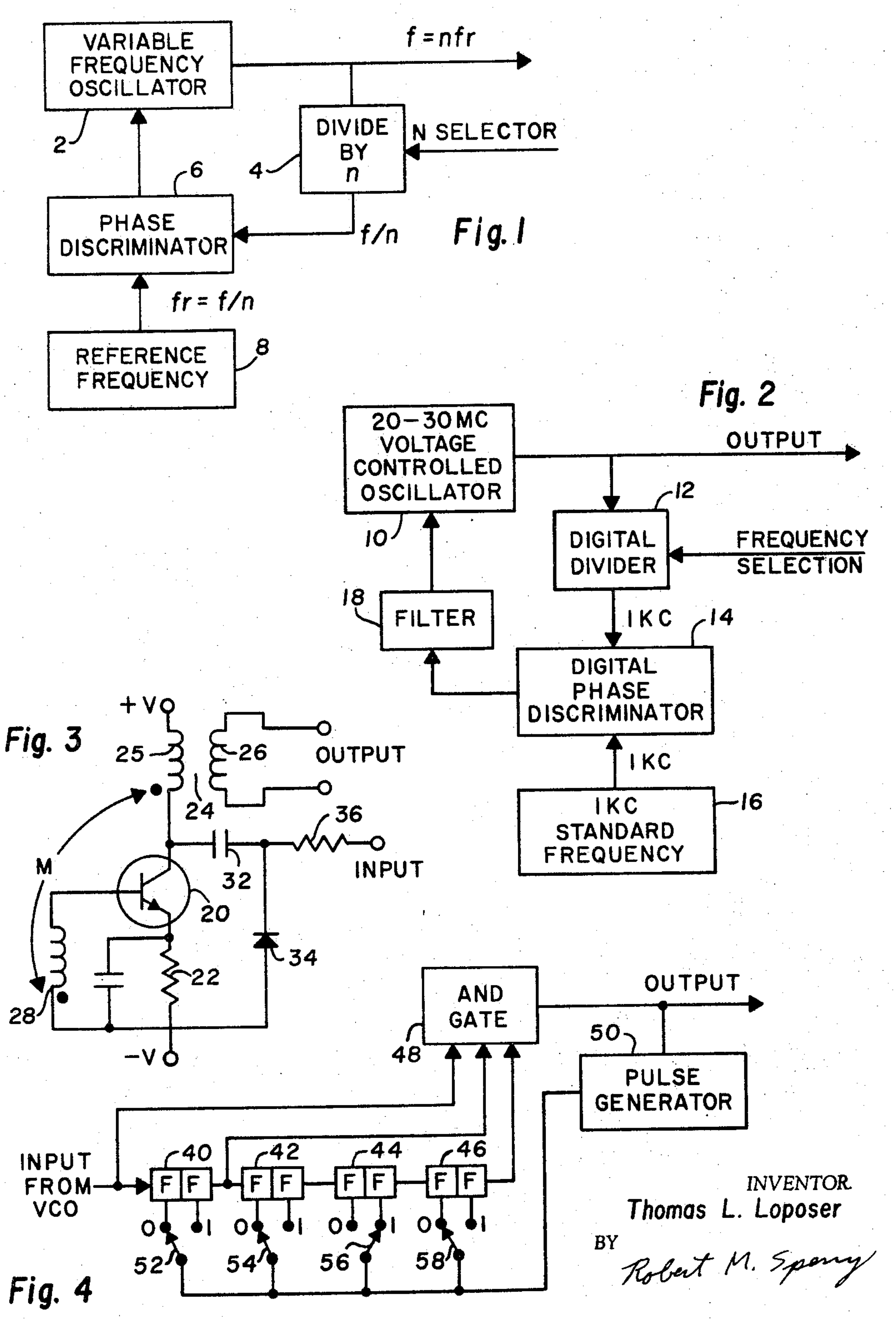
FIGURE 1 is a block diagram of a frequency synthesizer system using division within a phase-locked loop.
FIGURE 2 is a block diagram of such a system using a digital divider and phase discriminator.
FIGURE 3 is a schematic diagram of the voltage controlled oscillator shown in FIGURE 2.
FIGURE 4 is a block diagram of a basic unit of the digital divider shown in FIGURE 2.

A discussion of a frequency synthesizer using digital division by whole integers within a phase-locked loop will be given in order that fractional division can be understood in its fullest terms. A simplified block diagram of such a digital frequency synthesizer is shown in FIGURE 1, which utilizes a divider within a phase-locked loop. The loop comprises a variable frequency oscillator 2, a standard reference frequency generator 8, a phase discriminator 6 and a divider 4. The output of the oscillator is connected to the input of the divider, the output of which is connected to the phase detector. The reference frequency generator output is also connected to the phase detector and compared in phase with the divider output. The output of the phase detector, which is a voltage proportional to the phase difference between the divider output and the reference frequency, is fed back to the oscillator, thus closing the loop. Assuming the reference frequency to be less than the desired output frequency of the oscillator, the output frequency $f$ of the oscillator is divided by a suitable integer $n$ such that the output $f/n$ of the divider is equal to the reference frequency $f_r$. The output $f/n$ of the divider is compared with the reference frequency $f_r$ within the phase discriminator, and any phase difference is fed back to the oscillator in the form of a voltage to correct the frequency of the oscillator. As previously explained, there are many advantages gained by dividing the output frequency of the oscillator down to the reference frequency and comparing it with the latter to correct for any frequency shift, rather than multiplying the reference frequency up to the desired output frequency of the oscillator.

To understand the operation of the divider, reference is had to FIGURE 2 which is a simplified block diagram of a frequency synthesizer which will provide, for example, 10,000 channel frequency outputs between 20 mc. and 30 mc. This corresponds to a channel spacing of 1 kc. The 20 to 30 mc. oscillator 10, now referred to as a voltage controlled oscillator (VCO), provides the output frequency directly. The output of the VCO is also applied to a digital divider 12 where the frequency is divided by a selected integer whose value falls between 20,000 and 30,000. The loop is locked when the divider is dividing by an integer such that the output frequency of the divider is equal to the standard frequency output. The output of the divider is then a 1 kc. square wave signal which is applied to a digital phase discriminator 14, where it is compared to a 1 kc. reference signal obtained from a stable frequency source 16. The stable frequency source can be any suitable frequency generator whose frequency is stable, such as a crystal oscillator. The output of the discriminator, which is a voltage, is filtered by a filter 18 and used as an error signal to control the VCO frequency as will be explained hereinafter. To achieve the desired VCO frequency, the VCO output frequency is a function of the voltage supplied to its input from the phase discriminator. For example, to provide a 30 mc. output frequency, the digital divider must be set to divide by 30,000 so that the divider output will be 1 kc. Conversely, setting the divider to divide by 29,999, for example, will cause the VCO to seek a frequency of 29,000 mc. Changing the divide ratio by 1 causes a 1 kc. shift in VCO frequency; thus, the output channel spacing is seen to be equal to the reference frequency. It follows, then, that if the divide ratio of the divider can be selected by a set of switches to be any number between 20,000 and 30,000, phase lock conditions can be maintained, once established.

In order to understand the manner in which the VCO output is brought to the proper frequency, the individual components of the loop will be explained. There is shown in FIGURE 3 an example of a voltage controlled oscillator that is suitable for use with the system of FIGURE 2. The operation of this circuit will be readily apparent to those skilled in the art as a tuned oscillator comprising a transistor 20 having connected in series with its emitter-collector circuit the primary 25 of a transformer 24 and a resistor 22, with a feedback provided to the base of the transistor through coil 28 inductively coupled to the primary 25. Oscillations are sustained in the tank circuit containing the capacitor 32 connected to a variable capacitance diode 34, preferably of the semiconductor type. The input to the oscillator from the phase discriminator is through resistor 36, as shown. The output of the oscillator is via the secondary 26 of transformer 24. The capacitor 32 blocks the D.C. voltage from the input, where the magnitude of this D.C. voltage determines the magnitude of the capacitance 34, the latter which determines the frequency of oscillation of the circuit. Thus the frequency at the output 26 is determined by the input voltage across resistor 36.

It is desirable that the frequency selection can be made from a group of decade controls for operator convenience, and thus the digital divider is arranged in a group of decade units. Referring to FIGURE 4, there is shown a block diagram of a basic decade unit, several of which comprise the digital divider. Each of the decade units must be capable of dividing by any number between 1 and 10. In order to accomplish this, the decade unit is comprised of, for example, four flip-flops (labeled FF) 40, 42, 44 and 46, each of which is a bi-stable multivibrator and each of which switches to its alternate state with each pulse delivered to that flip-flop. Each flip-flop is then a divide by two unit and unless modified in some fashion, the four basic flip-flops divide by 16 ($2^4$). The four flip-flops are arranged in sequence and are interconnected, and an input from the VCO is connected to the input of flip-flop 40. An "AND" gate 48 is provided, and outputs from flip-flop 40 and flip-flop 46 and the input from the VCO are fed to the input of the "AND" gate. The output of flip-flop 40 is also connected to the input of flip-flop 42, the output of the latter being connected to the input of flip-flop 44, and the output of flip-flop 44 being connected to the input of flip-flop 46. Each of the flip-flops also have two additional inputs designated "0" and "1", as shown, to which a pulse can be applied to cause the flip-flop to flip from one stable state to the other stable state. Switches 52, 54, 56 and 58 are provided to connect between the "0" and "1" inputs of the flip-flops 40, 42, 44 and 46, respectively. The switches are commonly connected to the output from the "AND" gate through a pulse generator 50. The flip-flops and their corresponding operation are well known to those in the art and thus a showing of the individual circuits will not be given. The pulse generator 50 is a trigger circuit, for example, having a single stable state, such that each input pulse thereto from the "AND" gate cause the pulse generator to deliver an output pulse. The "AND" gate can be of any suitable design known in the art, such as, for example, a resistor connected between a positive potential source and commonly to the anodes of as many forward-biased diodes as there are inputs to the "AND" gate. Unless pulses are applied to all of the diodes simultaneously biasing them to cut-off, current will be passed through the resistor, thus maintaining a voltage drop thereacross. The existence of simultaneous positive pulses to each of the diodes causes current flow to cease through the resistor and represents an opening of the gate.

Defining the two logic states of each flip-flop as "0" and "1," as indicated by the two inputs of each flip-flop, the decade unit will count as shown in Table I. Assuming each flip-flop is initially in its "0" state, an input pulse

TABLE I.—COUNTER LOGIC STATE

| Input Pulses to FF40 | FF46 | FF44 | FF42 | FF40 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

into flip-flop 40 will cause it to flip from its "0" state to its "1" state. The output pulse from flip-flop 40 will be reversed in polarity from the input pulse, and thus flip-flop 42 will not be affected. The second input pulse to flip-flop 40 causes it to flip back to state "0" and in so doing, a pulse of proper polarity is applied to flip-flop 42 causing it to flip to its state "1". The third pulse to the input of flip-flop 40 causes it to return again to its "1" state but flip-flop 42 is again unaffected. Thus, in Table I, it can be seen that after three input pulses, the count of the decade unit is indicated by a "0" state in flip-flop 46, a "0" state in flip-flop 44, a "1" state in flip-flop 42, and a "1" state in flip-flop 40.

For purposes of illustration only, there will be described how the decade unit as shown in FIGURE 4 will yield a division of 6. The switches are set as shown in the figure such as that switch 52 is connected to the "0" input of flip-flop 40, switch 54 is connected to the "0" input of flip-flop 42, switch 56 is connected to the "1" input of flip-flop 44, and switch 58 is connected to the "0" input of flip-flop 46. After the ninth input pulse, the count contained in the decade unit or logic states of the counter is "1001" 9, as shown in Table I. At this point, the "AND" gate is activated by the "1" voltage in flip-flops 40 and 46 and the input from the VCO, and the next input pulse is allowed to pass through the "AND" gate as an output pulse. This output pulse is fed back to the counter through the pulse generator 50 and used to preset to a count of "0100," counting from right to left from flip-flop 46. From Table I, it can be seen that this count, namely "0100," is a count of 4 input pulses. Thus, the next 5 input pulses to flip-flop 40 will move the counter from this counter up to 9, which is "1001," and the sixth pulse will be passed by the "AND" gate as an output, which in turn will preset the divider to 4 again to count the next 6 input pulses. It can then be seen that there is derived at the output of the "AND" gate one pulse for each six pulses applied to the input of flip-flop 40. It will also be noted that the number which is preset into the counter by the switches 52–58 is equal to 10–$n$, where $n$ is the desired divisor and designated as the ten's complement.

The decade unit just described is capable of dividing by any whole integer between 1 and 10. In order to provide a divider capable of dividing an output frequency of the VCO in the order of several megacycles down to a reference frequency in the order of 100–1000 c.p.s., for example, it is apparent that several of the decade units must be used together, as will presently be explained.

Figure 5:
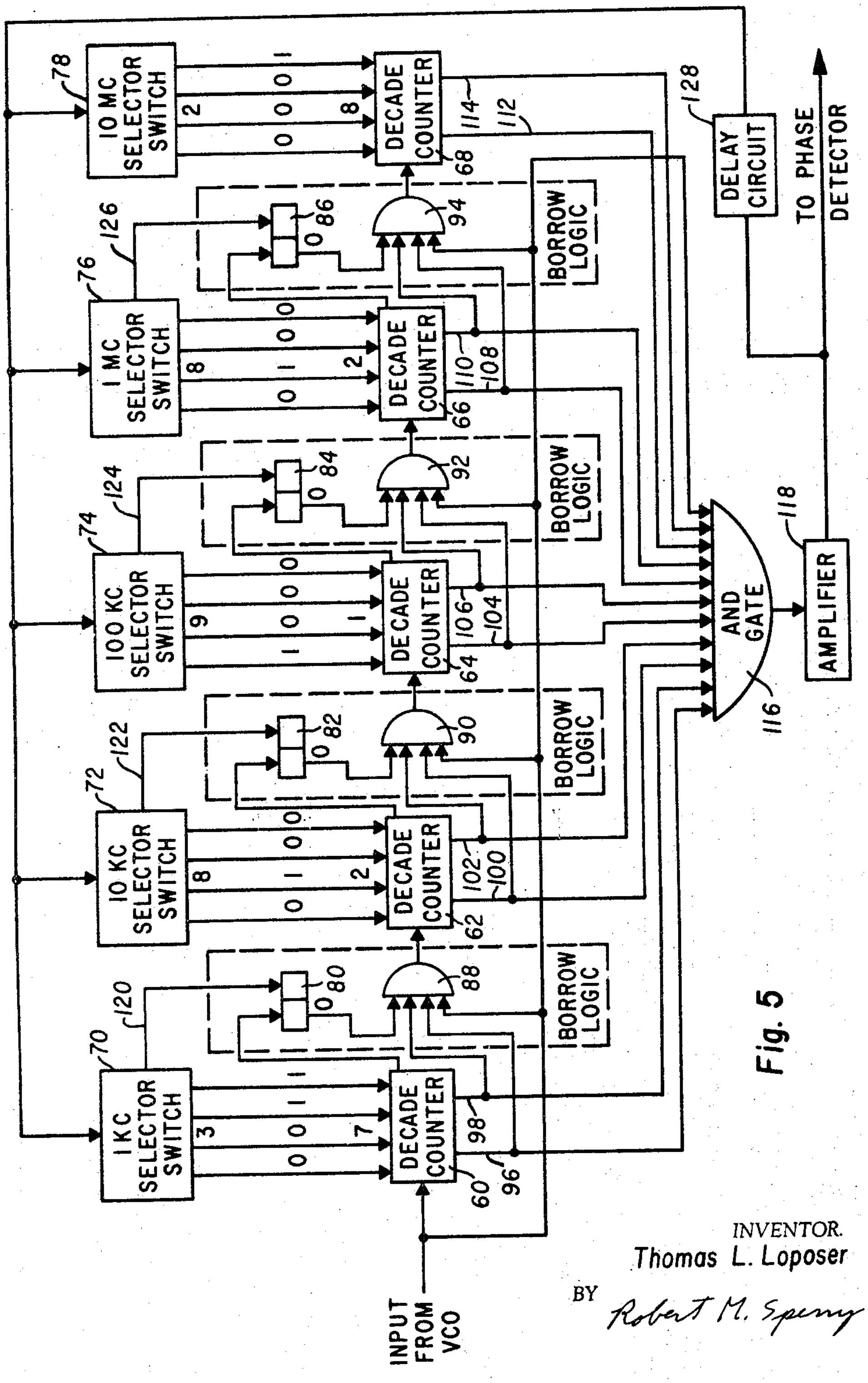
FIGURE 5 is a block diagram of the complete digital divider shown in FIGURE 2.

The foregoing description was with reference to the basic decade unit of the digital divider, whereas the following description will be with reference to the complete divider circuit incorporating a plurality of the decade units. In the previous discussion, the switches 52–58 are set to provide a count of 6 for purposes of illustration. However, consider now that each of the switches is replaced by a wire so that the unit always resets to "0" on the count of 10, i.e., the wire connects the pulse generator to the "0" input of each of the flip-flop 40–46. Now the decade unit will count to 10 each time rather than 6 used in the example above. By providing a set of switches to which the decade unit is preset from an external source, as will be explained presently, there is provided the capability of presetting the starting count in each decade in addition to the decade being able to count on the basis of 10. In order to provide a divider that will divide a frequency from the VCO in the range of, for example, several mc. down to a reference frequency of, for example, 100–1,000 c.p.s., the complete divider consists of 5 decade units 60, 62, 64, 66 and 68, as shown in FIGURE 5. Each succeeding decade unit is connected to the preceding decade unit through an "AND" gate such as denoted by numerals 88, 90, 92 and 94. In turn, the input of each "AND" gate is connected to the output of the preceding decade unit through a flip-flop as denoted by numerals 80, 82, 84 and 86. External selector switches are provided for presetting the starting count into each decade unit. These are denoted by numerals 70, 72, 74, 76 and 78, and labeled 1 kc. to 10 mc. switches, respectively. Four electrical connections are provided between each selector switch and its respective decade unit, one of the connections being to each of the flip-flops comprising the decade unit similar to the switches described in conjunction with FIGURE 4. An output from each selector switch is also connected to the input of the respective flip-flop connected between each decade unit and its respective "AND" gate. The latter connections are denoted by numerals 120, 122, 124 and 126, respectively. Outputs from the decade units corresponding to the outputs from flip-flop 40 and flip-flop 46 and connected to the "AND" gate 48 in FIGURE 4 are connected to an "AND" gate 116 in FIGURE 5 as shown. For example, outputs 96 and 98, connected to the first and fourth flip-flops within the decade unit 60 similar to the outputs from flip-flops 40 and 46 as shown in FIGURE 4, are connected to the input of the "AND" gate 116, outputs 96 and 98 also being connected to the "AND" gate 88 preceding decade unit 62. Similarly, outputs 100 and 102, connected to the first and fourth flip-flops within decade unit 62, are connected to the "AND" gate 116 and "AND" gate 90 preceding decade unit 64. Similar connections are provided from decade unit 64, denoted by connections 104 and 106, from decade unit 66 denoted by numerals 108 and 110, and from unit 68 denoted by numerals 112 and 114. It will be noted that the latter decade unit 68 has connections 112 and 114 connected only to the input of the "AND" gate 116, since decade unit 68 is the last in the series. An input from the VCO is provided to the input of the first decade unit 60 wherein a connection from this input is also connected to the input of the "AND" gate 116. Likewise, a connection is provided from the input to the first decade unit 60 to each of the respective "AND" gates separating the sequence of decade units. The output of the "AND" gate 116 is fed to an amplifier 118, and the output of the amplifier is connected to the inputs of each of the selector switches through a delay circuit 128 as shown. The output of the amplifier also constitutes the output of the divider which is connected to the phase discriminator 14 as shown in FIGURE 2. Each of the decade units also contains an "AND" gate and pulse generator as shown in the preceding FIGURE 4. The delay circuit comprises any suitable circuit for momentarily delaying the voltage from the output of the divider from reaching the selector switches, such as a coaxial delay line of proper length, an R–C charging circuit or the like.

The operation of the divider as shown in FIGURE 5 is as follows: The complete divider, consisting of five decade units, each of which is internally connected to divide by 10 as discussed above, has a capability to divide by a maximum factor of 100,000. The divider output pulse is returned through each of the switches from the output of the amplifier to preset each of the decade units to the ten's complement of the switch setting, thus making possible division by factors other than 100,000. As will be explained, proper counter operation, when the ten's complements are preset, requires that the first output of each decade be discarded except when that decade has been preset to "0." The "borrow logic" elements between each of the successive decade units as designated by the dashed enclosures and each comprising a flip-flop and an "AND" gate, such as flip-flop 80 and "AND" gate 88 between decade units 60 and 62, for example, perform the function of discarding the first output of each decade unit when that decade unit has been preset by the selector switch to a count other than 10. In order to understand the operation of the divider, an illustration will be given wherein the divider divides by an integer suitable to divide the frequency of the VCO output down from several mc. to 1,000 cycles per second. Assume for illustrative purposes only that a frequency of 28,983 mc. is to be provided at the output of the VCO and that the standard frequency is 1,000 c.p.s. The selector switches are then set at 28,983; that is, the 10 mc. selector switch is set at 2, the 1 mc. selector switch is set at 8, the 100 kc. selector switch is set at 9, the 10 kc. selector switch is set at 8 and the 1 kc. selector switch is set at 3, reading from right to left from the 10 mc. selector switch. By proper connections in the selector switch, to be described below, this sets the decade units to the ten's complements of the particular divisor. Thus the ten's complement of the setting 2 of the 10 mc. selector switch 78 is 8 and is represented by the connections "1000" between the 10 mc. selector switch and the decade unit 68, reading right to left. Similarly, the ten's complement of the numeral 8 set by the 1 mc. selector switch 76 is 2, shown by the connections between the switch and the decade unit 66 by the selection "0010," reading from right to left; and so on. It can be seen from Table I that the setting "0010" on the decade unit 66 is equivalent to presetting the decade unit at 2, thus providing a count of 8. Decade counter 64 is set at the ten's complement of 9, which is 1; the decade unit 62 is set at the ten's complement of 8, which is 2; and the decade unit 60 is set at the ten's complement of 3, which is 7. When the divider divides the output frequency of the VCO, which in this illustration is 28.983 mc., by divisor 28,983, the output from the amplifier 118 will be pulses at a repetition rate of 1,000 cycles per second which is the frequency of the standard frequency unit 16 in FIGURE 2. That is, the amplifier will produce an output pulse for each 28,983 input pulses to the decade counter 60 from the VCO.

Initially, each of the flip-flops 80, 82, 84 and 86 in the "borrow logic" circuits are set to "0," which is one of the stable states of the flip-flop. The "0" state of the flip-flop in the borrow logic circuit prevents any pulse from passing to the "AND" gate preceding the next decade unit, and until the flip-flop is flipped to its "1" state (alternate stable state) by a pulse, no pulse can pass from one decade unit to the next. In the present example, each of the decade units is set to its respective ten's complement of its respective selector switch. Thus, after three input pulses from the VCO to the input of the decade unit 60, the decade unit has advanced from a count of 7 to 8, 9 and 0, and provides an output pulse which flips the "borrow" flip-flop 80 from its "0" to its "1" state. After nine more input pulses, the decade unit has advanced again to the 9 count, such that the next input pulse may pass the "AND" gate 88 through flip-flop 80 to the decade unit 62, thus advancing the count of decade unit 62 by 1. It will be seen that it requires 13 input pulses to decade unit 60 before a pulse is passed into the input of decade unit 62. The reason for this, it will be seen, is the fact that the first output pulse from the decade unit 60 was used to flip the flip-flop 80 from its "0" to "1" state, but did not pass this pulse to the decade unit 62. Ten pulses thereafter, however, the pulse was advanced into the unit 62, thus advancing the count of the latter by 1. It will, therefore, be seen that in this manner the first output pulse of each decade unit is discarded in the sense that it is not passed to the succeeding decade unit. After the first pulse reaches the input of the decade unit 62, each tenth succeeding pulse will advance this unit by 1 until the 83rd pulse is reached. On this pulse, the second decade produces an output and sets its "borrow" flip-flop 82 to its "1" state. From this point, each 100th succeeding input pulse will advance the third decade unit 64 by 1. On the 983rd pulse, the third decade unit 64 will produce an output, set its "borrow" flip-flop 84 to its "1" state, and thereafter, each 1,000th input pulse will advance the fourth decade unit 66 by 1. The 8,983rd input pulse will produce an output from this decade unit, set its "borrow" flip-flop 86 to its "1" state and thereafter, every 10,000th succeeding input pulse to decade unit 60 will advance the fifth decade unit 68 by 1, until on the 28,982nd input pulse, the count in each of the five decade units will be 9. This count activates the output "AND" gate 116 so that the 28,983rd input pulse is passed through the gate 116 to become the first output pulse from the divider. This pulse presets the divider through the delay circuit to begin counting the next 28,983 pulses. The output from the divider is a rectangular wave which is generally unsymmetrical, and is differentiated in the amplifier by an R–C network to acquire a negative pulse for each cycle of the divider output. From the foregoing illustration, it can be seen that any whole integer divisor up to 100,000 can be set such that the VCO frequency can be divided down to that of the frequency standard.

Since each time a decade unit reaches the count of "9" it will reset itself to "0" via its internal connections, the external switches are provided to preset the units on the delivery of each pulse from the output of the divider, as just described. Therefore, a delay circuit 128, as described, is provided to delay the output pulse until after the decade units have reset themselves to "0," whence the output pulse becomes effective to preset the units at the selected setting. In this manner the "competition" in the conflicting settings by the internal connections of the units and the external selector switches is avoided. The time of delay is just sufficient to permit the internal setting to be made as will be readily understood by those familiar with the operation of counter circuits.

The selector switches comprise, for example, four wafer switches arranged in tandem on a shaft. The wipers of the wafer switches are commonly connected to the output of the delay circuit, and each wafer is wired such that it provides a closed circuit from the delay circuit to its flip-flop within its respective decade unit when a "1" setting is desired. Similarly, an open circuit is provided when a "0" setting is desired.

Figure 6:
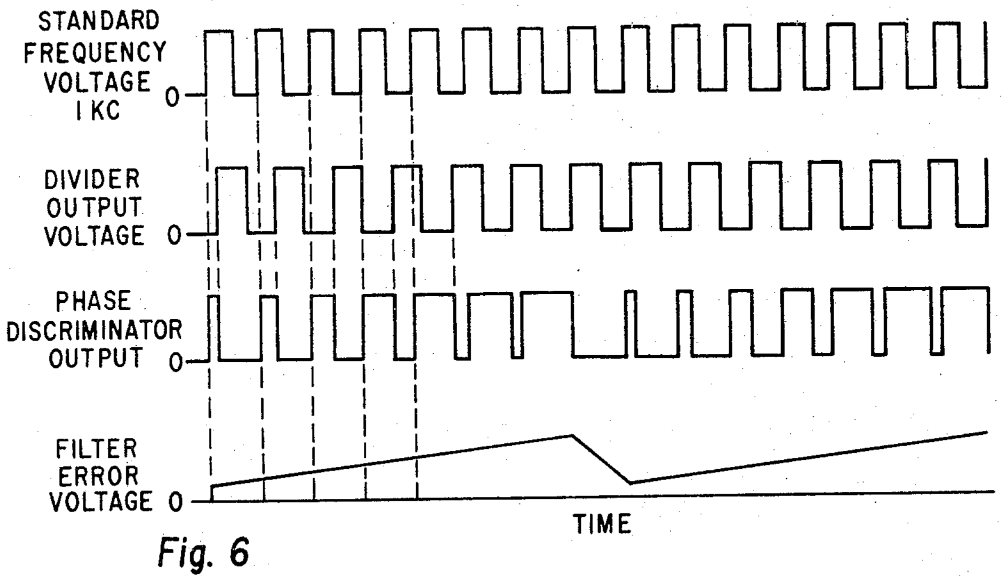
FIGURE 6 is a graphical representation of the output pulses from the standard frequency generator, the divider and the phase discriminator as shown in FIGURE 2.

The phase discriminator 14 as shown in FIGURE 2 is a conventional bi-stable multivibrator (flip-flop) with two inputs. A negative going pulse on one of the inputs, hereinafter referred to as the "reset" input, will initiate an output voltage and a negative going pulse on the other input, hereinafter referred to as the "set" input, reduces the output to zero, the operation of such a circuit being well known. Positive pulses applied to either input have no effect on the phase discriminator. The 1 kc. reference frequency is applied to the "reset" input so that each cycle of the 1 kc. signal provides an "ON" command to the multivibrator. The digital divider output is applied to the "set" input of the multivibrator and each cycle of the divider frequency provides an "OFF" command to the multivibrator. This action is represented by the wave forms shown in FIGURE 6, where a square-wave standard generator is used. As previously explained, the phase-locked loop shown in FIGURE 2 divides the output from the VCO down to the standard frequency where this frequency is compared with the standard, and any phase difference due to a frequency or phase difference between the two produces an output voltage proportional to the phase difference, which is fed back to the VCO to correct the output frequency of the VCO. That is, the output frequency of the VCO will be a multiple of the standard frequency. The VCO is normally designed to operate slightly below the lowest desired frequency when no error signal is applied. Thus, an error voltage is required to raise the VCO frequency to the desired frequency. The VCO, therefore, locks at a progressively lagging phase angle as the VCO frequency increases, but the lag is a constant for each desired frequency and does not imply a frequency error. The feedback loop accomplishes this automatically by locking in at a greater phase difference between the frequency standard and the divider output as the frequency is raised. Assuming a standard frequency voltage at 1 kc. and a divider output voltage at exactly the same frequency, it can be seen from FIGURE 6 that each cycle of the standard frequency turns the discriminator on and that each cycle of the divider output voltage turns the discriminator off. The action of the loop in the initial tuning of the VCO to the proper frequency for phase-lock can be understood by assuming, only for purposes of explanation, that the loop is open such that the output signal from the discriminator is disconnected from the VCO, and the VCO is allowed to run at some constant frequency error. In FIGURE 6, an example is assumed where the frequency of the divider output voltage is less than the standard frequency. Since each standard frequency cycle turns the discriminator on and each cycle of the divider output voltage turns the discriminator off, the phase difference between the standard frequency and the divider output voltage will increase as time progresses, and it can be seen that the phase discriminator output will be a series of width modulated pulses, the modulation frequency of which will be the difference frequency between the divider output and the frequency standard. In order to provide an error voltage to the VCO, a D.C. voltage must be provided by filtering the phase discriminator output. Filtering of the phase discriminator output in this example will produce an error voltage in the shape of a sawtooth waveform, the frequency of which is equal to the difference between the divider output and standard frequency. To understand how phase-lock is obtained, assume a divider output frequency less than the standard frequency wherein a sawtooth voltage waveform is produced as shown in FIGURE 6, thus causing the phase between the two to increase, which causes an increase in error voltage generation. This error voltage, fed back to the VCO when the loop is closed, increases the VCO frequency and partially corrects the frequency error. The phase and the error voltage continue to progress until a VCO frequency is obtained which results in a divider output frequency equal to the reference frequency. If the VCO frequency is initially too high rather than too low, then the sawtooth waveform of FIGURE 6 is reversed and the VCO sweeps downward to the desired frequency.

It is seen that the output of the phase discriminator, being a series of pulses at the reference frequency, contains the desired D.C. information as well as relatively large A.C. components at harmonics of the reference frequency. The D.C. information is used to provide the error voltage when filtered. The A.C. components, if allowed to reach the VCO, will frequency modulate the VCO output. Since the modulation frequency of this FM signal would be the reference frequency, sidebands will be produced on the VCO output with spacings equal to the reference frequency, and the VCO output will contain undesirable sideband energy.

Figure 7:
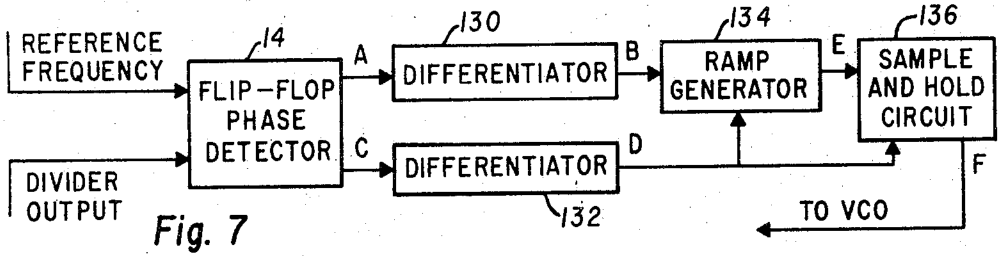
FIGURE 7 is a block diagram of a sample and hold circuit used for reducing the filtering requirements of the discriminator output.
Figure 8:
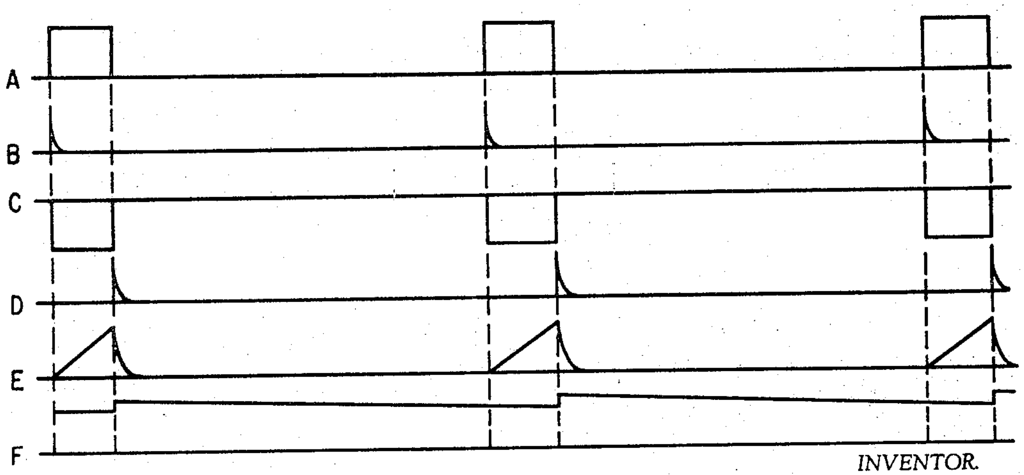
FIGURE 8 is a graphical representation of the various voltage waveforms within the sample and hold circuit and related circuitry.

One method for partially eliminating this sideband energy from the VCO output is to filter the discriminator output and remove the A.C. components thereof. Since the phase discriminator is a sampling device which samples the phase difference once each cycle, an example of a filter that will suppress the A.C. components is one which can instantaneously absorb information when the sample is taken and hold this phase error information until the next sample is taken. Such a filtering system is shown in the block diagram of FIGURE 7, and the corresponding waveforms derived from the various components of the filter are shown in FIGURE 8. The leading edge of the pulse at one output from the phase discriminator flip-flop is used to start a ramp generator or integrator 134, and the trailing edge of the pulse at the other output of the discriminator output initiates a sample of the integrated voltage. In order to provide an initiating pulse to the ramp generator, a conventional differentiator 130, such as an R–C circuit, is connected to said one output of the phase discriminator, the output of the differentiator of which is connected to one input of the ramp generator. Said other output of the discriminator is connected to the input of a similar differentiator 132, the output of the latter being connected to another input of the ramp generator and to a sample and hold circuit 136. The output pulse from the discriminator preceding the differentiator 130 and denoted at A is shown in FIGURE 8, and the differentiation of this pulse is shown at B in FIGURE 8. Similarly, the pulse applied to the differentiator 132 when the discriminator is cut off by the application thereto of a divider output pulse is the reverse of pulse A and is denoted at C in FIGURE 8, the differentiation of this pulse being denoted at D. The ramp generator generates a sawtooth pulse as shown at E and is fed to the sample and hold circuit. The pulse D initiates a sample of the voltage E of the ramp generator, and the ramp voltage at the sampling point is proportional to the width of the flip-flop discriminator pulse. That is to say, the voltage of the ramp pulse E at the sampling point is proportional to the time difference between the occurrence of a pulse applied to the "reset" input of the discriminator from the reference frequency generator and the succeeding pulse applied to the "det" input of the discriminator from the divider. Thus the ram voltage at the sampled point is proportional to the phase difference detected by the discriminator and constitutes the proper error voltage to be fed to the VCO.

A capacitor within the sample and hold circuit is charged to the sampled ramp voltage through a short time constant charging circuit. The ramp voltage is then reduced to zero by the pulse D, and the capacitor holds the sampled voltage except for the normal decay through a long time constant discharge path. The sample and hold circuit output is now a very small sawtooth superimposed on the D.C. error voltage as shown at F in FIGURE 8, wherein the frequency of the sawtooth is equal to the reference frequency, but whereas the fundamental frequency component of the output is now significantly less compared to the D.C. error component.

The ramp generator can be of any suitable design, and since circuits of this type and operation are well known, a detailed description will not be undertaken here. Insofar as initiating the generation of the ramp by pulse B and taking a sample and stopping the ramp generation by pulse D, a simple bi-stable flip-flop circuit, for example, can be used for this purpose, where pulse B initiates one of the stable states and pulse D initiates the other. The sample and hold circuit is of conventional design and is analogous to pulse width demodulation circuits used in pulse modulated telemetry systems. For example, pulse E is applied to the commonly connected bases of each of two transistors, one a pnp and the other an npn, whose emitters are commonly connected and in which a voltage is applied across their collectors. A capacitor connected to the commonly connected emitters is charged proportional to the ramp voltage as the ramp voltage initiates conduction of one of the transistors, the other transistor being rendered conductive on a negative going ramp. Another transistor having its emitter-collector circuit connected to the commonly connected bases of the two transistors renders the conductive transistor non-conductive when the sampling pulse D is applied to the base of said another transistor. Thus the charging of the capacitor is stopped at the proper voltage.

Although the sample and hold circuit just described is, to a large extent, effective in reducing the A.C. components of the error voltage, strict requirements on the VCO output necessitate further filtering. In order to determine the requirements of such a filter 18 as shown in FIGURE 2 to reduce the sideband energy resulting from the A.C. components at the output of the phase discriminator to an acceptable minimum, the VCO may be represented by a voltage to frequency transformation wherein the output frequency is a function of the input voltage. Assuming, for purposes of example only, that the specification on the frequency synthesizer is the spurious sidebands caused by the A.C. components from the discriminator being at least 100 db down from the desired carrier output level (the chosen frequency of the VCO), it can be shown that the A.C. sampling frequency component to the VCO voltage must be in the order of 164 db below the maximum D.C. error voltage when the sampling frequency (reference frequency) is 1000 c.p.s. and when the VCO output frequency is about 30 mc. It can also be shown under these conditions that the sample and hold circuit as described in FIGURE 8 provides an output into the VCO, the A.C. energy of which is in the order of 90 db below the D.C. error voltage. Thus an additional filter is required to further reduce the A.C. energy by 74 db (164 db–90 db) in order to meet this specification. The improvement provided by the invention greatly reduces the filtering requirements in addition to lending versatility to the synthesizer by permitting the use of any desired frequency of the standard frequency generator while also permitting virtually any channel spacing, as will presently be described.

The concept of the digital frequency synthesizer, utilizing a digital divider within a phase-locked loop, is based on the fact that the voltage controller oscillator output frequency may be divided down and the phase of this lower frequency compared to a single, stable reference frequency to provide a voltage to correct the frequency of the VCO. Heretofore, it has been assumed that the digital divider chain must inherently divide by an integral whole number. This is meant that the VCO output frequency must always be a direct multiple of the reference frequency. To illustrate, consider a requirement for a 2 to 32 mc. VCO output channelized in 100 cps. steps. If the divider is to divide by integral whole numbers, the divider output must be 100 c.p.s., since this is the lowest common denominator of all the output frequencies. The reference frequency must also be 100 c.p.s., meaning that the phase detector samples the phase of the VCO 100 times each second. Also pointed out in the previous discussion, the output of the phase detector contains the necessary D.C. error voltage but also has a fairly large component at the sampling frequency and multiples thereof. If these A.C. components of the output error voltage are allowed to pass to the VCO, they will frequency modulate the VCO and produce spurious sideband energy in the output. A filter is, therefore, required to reduce these A.C. components to acceptable levels. Considering a standard frequency of 100 c.p.s. and a requirement that the FM sideband energy be held at least 100 db below the carrier output of the VCO, it can be shown that the A.C. sampling frequency voltage must be 184 db below the maximum D.C. voltage applied to the VCO. It can be shown under these conditions that the sample and hold circuit reduces the A.C. components by 70 db. That is, the 100 c.p.s. sampling voltage at the output of the sample and hold circuit is only 70 db down, while it must be reduced to a value of 184 db down at the VCO input. It can further be shown that when a filter is used, the filter attenuation requirement at the sampling frequency is inversely related to the square of the sampling frequency. For example, where 114 db attenuation is required at 100 c.p.s., only 74 db attenuation is required where the sampling frequency is 1 kc., and 34 db attenuation is required for a sampling frequency of 10 kc. It is, therefore, readily apparent that it is quite profitable to use a standard frequency of 1 kc. or higher if the 100 c.p.s. or proper channel separation can still be maintained. This can be done if the divider chain can divide by fractions rather than integral whole numbers. To illustrate, if the desired output frequency of the VCO is 29.999,900 mc., division of this frequency by the whole integer 299,999 yields a divider output frequency of 100 c.p.s., and thus a 100 c.p.s. standard frequency must be used. However, dividing the same VCO frequency by the fractional divisor 29,999.9 yields a divider output frequency of 1000 c.p.s., and thus the standard frequency may be increased by an order of magnitude. Similarly, dividing a VCO frequency of 29.999,800 mc., by the fractional divisor 29,999.8 also yields a divider output frequency of 1000 c.p.s. It is now apparent that use of fractional division permits the use of a higher standard frequency while permitting as close channel spacing in the VCO output as desired; in the example above, the channel spacing is 100 c.p.s. when tenths of whole integers are used. Fractional divisors of hundredths of whole integers, such as 29,999.89, permits channel spacing of 10 c.p.s. in the above example, and so forth.

To illustrate how fractional division may be effected, it will be assumed for purposes of illustration that a VCO output frequency of 29.999,900 mc. is desired and that a 1000 c.p.s. standard frequency is used. By dividing this frequency by 30,000 nine times, the divider will produce 9 output pulses for 270,000 input cycles from the VCO. On the tenth division, the VCO frequency will be divided by 29,999. This will produce a tenth output pulse coincident with the 299,999th input cycle. There has now been provided exactly 10 output pulses for exactly 299,999 inputs for an average division of 29,999.9. The output pulses from the divider are not, however, equally spaced, but the sequence of output pulses spacing is repeated for each block of 10 output pulses. The following Table II shows the necessary division weighting to divide by any 0.1 decimal increment when the divisors $x$ and $y+1$ are used.

TABLE II.—FRACTIONAL DIVISION WEIGHTING

| Desired Division Ratio | Number of Times Divided by x | Number of Times Divided by x+1 |
|---|---|---|
| x·1 | 9 | 1 |
| x·2 | 8 | 2 |
| x·3 | 7 | 3 |
| x·4 | 6 | 4 |
| x·5 | 5 | 5 |
| x·6 | 4 | 6 |
| x·7 | 3 | 7 |
| x·8 | 2 | 8 |
| x·9 | 1 | 9 |

For a division by any 0.1 increment other than 0.1 and 0.9, there is a choice as to the sequence in which the divide ratio can be varied between $x$ and $x+1$. For example, to divide by $x\cdot 6$, the sequence could be followed to realize the average division by interdispersing six $x+1$ divisions in any order within the total of 10 divisions to be made by the decade unit, and then repeating this exact sequence during the successive divisions.

If a fractional division is made according to the above description, the output of the phase discriminator will be a series of stepped voltages. Reference is had to FIGURE 9(a) which illustrates an example of a division by $x\cdot 9$. Assuming that the first output pulse from the divider coincides in phase with the first sampling pulse from the frequency standard, then the phase discriminator would deliver 0 volts output as shown. Assuming that a divisor of $x+1$ is used for the first nine divisions and that a divisor of $x$ is used for the tenth division, it can be seen that continual division by $x+1$ will result in a phase slip of 0.1 input cycles for each reference pulse, and that after dividing by $x+1$ nine times, the divider output has slipped behind the reference by a time equal to 0.9 of an input cycle. On the tenth division, the divider is set to divide by $x$, and the tenth division produces an output pulse that occurs simultaneously with the tenth reference pulse. This zero phase difference returns the discriminator output to zero and the conditions are exactly the same as occurred ten pulses before. The sequence is repeated to produce a repetitive stepped output from the discriminator. Assuming a sample and hold circuit is used in conjunction with the discriminator in this example, it will be seen that for every actual division by $x+1$, the sample and hold circuit produces an additional step voltage, which voltage increases in steps, as shown, until the tenth divider output pulse, which pulse is in phase with the tenth sampling pulse and the sample and hold output voltage is reduced to zero.

Figure 9B:
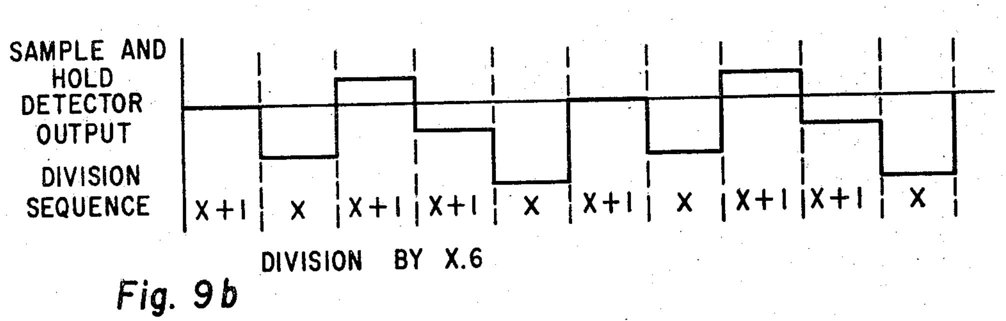
Figure 9C:
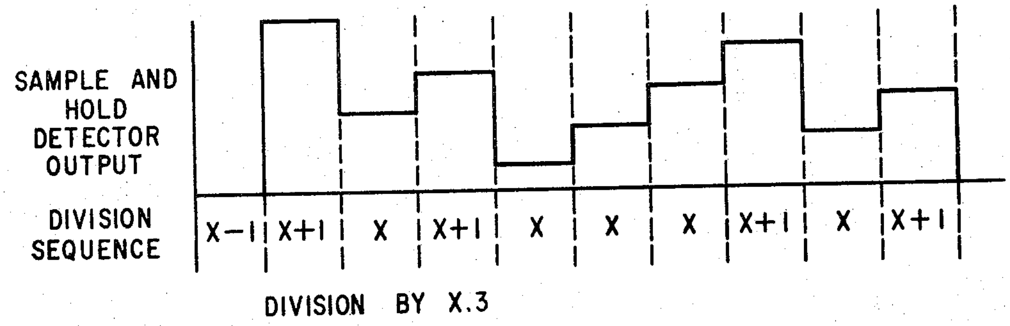

An example of the sample and hold output for a division by $x\cdot 6$ is shown in FIGURE 9($b$), where the sequence of actual divisions by $x$ and $x+1$ is as shown. This particular sequence can be varied as desired, so long as there are six actual divisions by $x+1$ and four actual divisions by $x$ within each consecutive 10 actual divisions, and so long as the particular sequence chosen is repeated. It will be noted in this example that the sample and hold voltage varies in steps according to the degree of phase difference between the standard frequency pulses and the divider output pulses. For example, the difference between the desired divisor $x\cdot 6$ and $x+1$ is 0.4, and thus the first divider output pulse shown drops the sample and hold voltage by 4 units. The difference between the desired divisor $x\cdot 6$ and $x$ is 0.6, and thus the second divider pulse shown increases the sample and hold voltage by 6 units, and so forth.

As previously described, a fixed phase shift normally exists between the divider output and the reference frequency which provides a fixed D.C. voltage upon which the stepped waveform just described is superimposed. It may then be readily seen that the forced variation in divide ratio has not altered the ability of the loop to maintain phase-lock. Assuming that the VCO frequency is somewhat lower than desired, the tenth divider output pulse will occur later in time and the detector will not return to the same voltage it had as described in the illustration above, and each sequence of the divide pattern will carry the voltage further from the start conditions. This represents a shift in the D.C. voltage fed back to the VCO and provides a correction to maintain phase-lock. The reverse happens if the VCO is too high in frequency.

Because of the fractional division, the output waveforms are always repetitive at a 100 c.p.s. rate when the standard frequency is 1000 c.p.s. and it is evident that some of them contain 100 c.p.s. frequency components and multiples thereof. It will also be remembered from the preceding discussion that when whole number division is used, the discriminator output has a 100 c.p.s. sawtooth superimposed on the D.C. output, the A.C. components of which necessitate the use of filtering. A quantitative examination by Fourier analysis of the output waveform as derived by a fractional division shows that the filtering requirements are considerably reduced as will presently be described. In performing the Fourier analysis, it will be remembered that the decay of the sample and hold circuit previously described must be added to these waveforms in the form of a 1 kc. sawtooth voltage. The least frequency contained in the sawtooth voltage is, however, 1 kc. and will not affect the lower frequency components. From a Fourier analysis of these waveforms, it can be shown that many of the frequency components do not exist in the fractional division output and are an infinite number of db below the D.C. level. For example, when dividing by $x\cdot 1$ or $x\cdot 9$, it can be shown that a reduction of 6 db below the whole number division is effected. And, for example, when dividing by $x\cdot 3$ or $x\cdot 7$, it can be shown that a reduction of 14 db is effected below the whole number division. This is helpful in reducing the filter requirements; however, further reduction can be effected.

The preceding examples of fractional division was carried out by dividing by adjacent integers, i.e., $x$ and $x+1$. There is also a choice of dividing by any other integer, such as $x-1$, $x+2$, etc. Dividing by specific sequence of $x-1$, $x$, $x+1$ and $x+2$ can yield detector outputs in which the level of A.C. frequency components are completely eliminated at certain frequencies and considerably reduced at others. For example, a fractional division by $x\cdot 3$ in the sequence of $x-1$, $x+1$, $x$, $x+1$, $x$, $x$, $x$, $x+1$, $x$ and $x+1$ results in an output in which Fourier analysis indicates that none of the waveforms contain any 100 c.p.s., 300 c.p.s., 700 c.p.s. or 900 c.p.s. energy. In fact, by using various sequences of the above four integers for divisions between $x\cdot 1$ and $x\cdot 9$ indicate that none contain any of the above noted A.C. energy, and only a few contain 500 c.p.s. energy. Thus it can be seen that the filtering requirements can be further reduced by this method. An illustration of the sample and hold detector output for an average division by $x\cdot 3$ according to the above sequence, using $x-1$, $x$ and $x+1$, is shown in FIGURE 9($c$).

A description of the circuitry necessary to carry out the fractional division will now be described. It will be remembered from the preceding discussion that the divider was preset to yield an output for a given number of inputs. It will also be recalled that this was effected by presetting each decade unit to the ten's complement of that decade switch setting and then effecting the "borrow 1" with a borrow logic unit. The borrow logic unit operated so that it did not pass the first output pulse from the preceding decade unit, unless that decade unit was set to "0." In effect, this unit refused to carry forward the first pulse when a "borrow" was required. To effect fractional division and realize the necessary waveforms to give an elimination of A.C. components at certain frequencies, it has been shown that the divider should be capable of dividing by such numbers as $x-1$, $x$, $x+1$ and $x+2$. If the basic divider is then set to divide by $x-1$, a division of $x$ may be made by withholding one input pulse, or a division by $x+1$ by withholding two input pulses, etc. This is the same function which the above mentioned "borrow logic" unit performed, so that input pulses may be withheld by inserting such units ahead of the decade counters. Thus it can be seen that if the divider is set to divide by the smallest divisor to be used, "borrow logic" units can be used to effect divisions by larger divisors, simply by withholding a number of input pulses equal to the difference between the smallest divisor at which the divider is set and the desired divisor.

A block diagram of a divider for carrying out this function is shown in FIGURE 10 where, for purposes of illustration only, the frequency selector switches are set for a VCO frequency of 28.983 mc. and a standard frequency of 10,000 c.p.s. is to be used. Thus an average division by 2,898.3 is required and the divider shown is capable of dividing by the whole numbers $x-1$, $x$ and $x+1$, where $x$ can be any number but in this example is 2,898. The divider consists of four principal decade units 62, 64, 66 and 68, and selector switches 72, 74, 76 and 78, respectively, are provided for presetting the units. A fifth selector switch 70 is in conjunction with borrow logic circuitry preceding the decade counter 62, to be explained. The divider is set to divide by $x-1$, and when a division by $x$, $x+1$, etc., is desired, the proper number of pulses are withheld by borrow logic units. The decade counter 68 is set at 8 which is the ten's complement of the 2 setting on the selector switch 78, and the decade units 64 and 66 are similarly set. It will be noted, however, that decade unit 62 is set at 3 which is the eleven's complement of the setting 8 on the selector switch 72 so that the divider is then set to divide by $x-1$. The divider also comprises three additional "borrow" logic output pulses from the divider, and is connected to the diode matrices to be monitored by the latter. Outputs from the 1 kc. selector switch are connected to the diode matrices.

In order to illustrate how the divider will work and assuming that it is desired to use a reference frequency of 10 kc. such that a division by the fractional number 2,898.3 yields the 10 kc. output and will provide 1 kc. steps in VCO frequency, it will be assumed that an output has just occurred. This means the 10 mc.—10 kc. decade counters have just been preset to 8213. Considering only the four decade units 62, 64, 66 and 68, it will be seen that three input pulses to decade unit 62 will be required before it resets to "0," and then ten more pulses will be required before a pulse will pass through flip-flop 82 into the input of decade unit 64. Thus a total of 17 pulses is required to advance the decade unit 64 by 1, and each tenth input pulse thereafter will advance decade unit 64 by 1 until 196 input pulses to decade unit 62 have occurred. The next pulse advances decade unit 66 by 1, etc. It will be seen that an output pulse through "AND" gate 116 will be delivered on the 2,897th input pulse. Since a division by 2,898.3 is desired, this number 2,897 represents a division by $x-1$, since $x$ is equal to 2,898.

Examining the circuitry preceding the 10 kc. decade unit 62, it will be noted that if all three flip-flops 136, 138 and 140 are set to "0" at the time the decade units are preset, all three gates are closed. The first input pulse from the VCO will switch the first flip-flop 136, thereby opening the first gate 130 so that the second input pulse may reach the second flip-flop 138. This pulse switches the second flip-flop which opens the second gate 132, the third input pulse then reaching the third flip-flop 140, switching and opening the third gate 134. The fourth input then reaches the decade unit 62 and the count proceeds as just described. There has then been added an additional three input pulses before an output is provided by setting all three flip-flops to "0." None, one or two pulses may similarly be added by setting none, one or two of the three flip-flops.

As an example of how the division by 2,898.3 is realized, the sequence is preset as shown in the following Table III. It will be noticed that the three flip-flops 136,

TABLE III.—PRESET TABLE

| FF 136 | FF 138 | FF 140 | 10 kc. Decade | 100 kc. Decade | 1 mc. Decade | 10 mc. Decade | Input Pulses Required for One Output Pulse |
|---|---|---|---|---|---|---|---|
| 1 | 1 | 1 | 3 | 1 | 2 | 8 | 2,897 (x−1) |
| 0 | 0 | 1 | 3 | 1 | 2 | 8 | 2,899 (x+1) |
| 0 | 1 | 1 | 3 | 1 | 2 | 8 | 2,898 (x) |
| 0 | 0 | 1 | 3 | 1 | 2 | 8 | 2,899 (x+1) |
| 0 | 1 | 1 | 3 | 1 | 2 | 8 | 2,898 (x) |
| 0 | 1 | 1 | 3 | 1 | 2 | 8 | 2,898 (x) |
| 0 | 1 | 1 | 3 | 1 | 2 | 8 | 2,898 (x) |
| 0 | 0 | 1 | 3 | 1 | 2 | 8 | 2,899 (x+1) |
| 0 | 1 | 1 | 3 | 1 | 2 | 8 | 2,898 (x) |
| 0 | 0 | 1 | 3 | 1 | 2 | 8 | 2,899 (x+1) |
| Total Input Pulse Required for 10 Outputs | | | | | | | 28,983 |
| Average Input Pulses per Output | | | | | | | 2,898.3 |

units preceding the decade unit 62, these units comprising flip-flop 136 and "AND" gate 130, flip-flop 138 and "AND" gate 132, and flip-flop 140 and "AND" gate 134. There is also provided a first diode matrix 144, the output of which is connected to the input of flip-flop 136, a second diode matrix 146, the output of which is connected to the input of flip-flop 138, and a third diode matrix 148 whose output is connected to the input of flip-flop 140. A decade counter 142 is used to count the number of

138 and 140 are set to the "1" state initially. The first divide action then takes 2,897 inputs to derive an output. This output is used to preset the next count into the divider. Next, 2,899 input pulses are required to produce the second output, 2,898 input pulses required to produce the third output, etc., as shown in the sequential table. According to the table, there is required 28,983 input pulses for ten outputs for an average division of 2,898.3. It will be seen that the flip-flops must be set accordingly by switch 70 and the diode matrices to give this particular sequence of division.

The decade counter 142 is used to count the output pulses of the divider and control the presetting sequence on the flip-flops 136, 138 and 140. The diode matrices 144, 146 and 148 monitor the counter position and connect the preset pulse through switch contacts on the 1 kc. selector switch 70 to the three flip-flops. The position of the selector switch 70 determines the sequence in which the three flip-flops are set. For purposes of illustration, the 1 kc. selector switch can comprise 30 wafer switches mounted on a shaft, the wafer switches being divided into three groups of ten each to control the presetting of the three flip-flops, respectively. In order to describe the manner in which the switch is wired for presetting a flip-flop, the second group of ten wafer switches within the 1 kc. selector switch will, for purposes of explanation, be described in conjunction with the presetting of the second borrow logic flip-flop 138 through the second diode matrix 146. The following Table IV shows the switch wafer coding for presetting the second flip-flop in which a "1" denotes that the switch connects the divider output pulse

TABLE IV.—SWITCH WAFER CODING

| Selected Digit | Switch Wafer Number | | | | | | | | | |
|---|---|---|---|---|---|---|---|---|---|---|
| | 1 | 2 | 3 | 4 | 5 | 6 | 7 | 8 | 9 | 10 |
| 0 | 0 | 0 | 0 | 0 | 0 | 0 | 0 | 0 | 0 | 0 |
| .1 | 0 | 1 | 0 | 1 | 0 | 0 | 0 | 0 | 0 | 1 |
| .2 | 1 | 0 | 1 | 0 | 0 | 1 | 0 | 1 | 0 | 0 |
| .3 | 0 | 1 | 0 | 1 | 0 | 0 | 0 | 1 | 0 | 1 |
| .4 | 0 | 1 | 0 | 0 | 1 | 0 | 1 | 0 | 0 | 1 |
| .5 | 0 | 1 | 0 | 1 | 0 | 1 | 0 | 1 | 0 | 1 |
| .6 | 1 | 0 | 1 | 1 | 0 | 1 | 0 | 1 | 1 | 0 |
| .7 | 1 | 0 | 1 | 1 | 0 | 1 | 1 | 0 | 1 | 1 |
| .8 | 0 | 1 | 0 | 1 | 1 | 0 | 1 | 0 | 1 | 1 |
| .9 | 1 | 0 | 1 | 0 | 1 | 1 | 1 | 1 | 1 | 0 |

through the switch to its respective diode matrix, and a "0" denotes an open circuit. Under the column "selected digit," there is represented the position of the switch and in the example given, the switch is set to select the digit .3. The table shows that for a setting of .3, the switch will pass a pulse through the second, fourth, eighth and tenth wafers, since these particular wafers are denoted by a numeral "1" and are wired accordingly. This corresponds to the flip-flop 138 setting as shown in Table III to give the particular divide sequence.

Referring now to FIGURE 11, there is shown an example of diode matrix 146 that will monitor the number of output pulses from the divider passing to the decade counter 142, and will pass pulses from the selector switch 70 to its respective "borrow logic" flip-flop in the proper sequence. The diode matrix comprises an array of eight conductors 168, each of which is connected to one of the outputs of one of the flip-flops 160, 162, 164 and 166 comprising the decade counter 142. An array of ten conductors 170 crosses the eight conductors 168, and each of these conductors is connected to one of the terminals of the wafer switches within the particular group of ten wafers in the selector switch 70. There are four diodes 172 connected between each of the array of conductors 170 and a selected four of the array of conductors 168. Referring back to the previous Table I, it can be seen that the diodes are connected in the same sequence as is represented by the count contained in the decade counter 142. That is to say, diodes are connected between the first of the conductors 170 and four of the conductors 168 such that said first conductor is connected to the zero states of the decade counter. Similarly, diodes are connected such as to connect the second of the conductors 170 to the "one" count of the decade counter 142; thus, a diode is connected between the "1" state of the flip-flop 160 and the conductor 170, between the "0" state of flip-flop 162 and said conductor, between the "0" state of flip-flop 164 and said conductor, and between the "0" state of flip-flop 166 and the conductor.

FIGURE 11 also shows the second group of wafers in the switch 70 comprised of individual switches 158 as just described, and it will be seen that according to Table IV, the switch positions are such that the second, fourth, eighth and tenth wafers provide connection between the divider output and the second flip-flop 138 when the decade counter 142 is at the proper count. The diode matrix is essentially a binary to decimal converter and for each position of the counter, connects one of the switches through to the output. Assuming the decade counter registers a count of zero, this being equivalent to each of flip-flop 160–166 in counter 142 being in a "0" state, the matrix puts a ground on all lines excepts the first conductor 1 of the array of conductors 170. That is, when a diode is connected between one of the states of the flip-flops that is conducting and one of the conductors 170, it is back biased to prevent conduction through the diode. Thus, if switch 1 is closed, the divider output pulse would be connected through to reset the second flip-flop 138. As the counter advances with each divider output pulse, the contacts are sequentially connected to provide reset pulses to the flip-flop; in this case, for division numbers 2, 4, 8 and 10.

Identical matrices operate with the other two switch groups and the other two switch groups are coded according to Table III. As will be seen from FIGURE 11, the respective conductors 168 of the three diode matrices are all connected together in series and to the various states of the decade counter 142. In this manner, extra counts are added to the basic $x-1$ count of the divider to arrive at decimal fractional division.

It should be noted that the process may be carried further. Wherein there has been shown division by $\frac{1}{10}$ decimal increments, division by $\frac{1}{100}$ decimal increments or $\frac{1}{1000}$ decimal increments can also be provided. In each case, when the last digit of the divisor is changed by 1, the VCO frequency is changed by 1 kc. In order to implement a fractional division by $\frac{1}{100}$, there will be required two decade counters instead of the one decade counter 142, and there will also be required matrices capable of connecting 100 lines instead of 10. However, the same principles apply and further reduction of the low frequency complements are possible with $\frac{1}{100}$ and $\frac{1}{1000}$ divisions as the reference frequency is raised.

The foregoing example of fractional division and the description of the related circuitry is for purposes of explanation, and as just stated, the process can be extended beyond that specifically described. Numbers other than $x-1$, $x$, and $x+1$ can be used as divisions, and different sequences are possible. The particular sequences used will depend upon the extent the particular sequence will reduce or eliminate the A.C. components in the error voltage. The particular A.C. frequency components are determined by a Fourier analysis from curves similar to those of FIGURE 9. Comparison of FIGURE 9(*c*), which is a fractional division using more than just adjacent integers, with FIGURE 9(*a*), which is a fractional division using only adjacent integers, reveals that the overall waveform of FIGURE 9(*a*) resembles a sawtooth wave repetitive at the standard frequency, whereas, that of FIGURE 9(*c*) resembles no regular shape. The sawtooth contains an A.C. component at the reference frequency in addition to higher frequencies, whereas, the voltage of FIGURE 9(*c*) contains much less undesirable A.C. energy. A rule of thumb, it appears, is that voltages of very irregular configurations are more desirable than those of regular configurations, although, an exact analysis is possible by Fourier analysis.

Modifications in the divider system, such as an addition of more decade counters and borrow logic circuits, make possible division by any fraction on a digital basis. It is apparent, then, that any desired standard frequency can be used, and yet, any desired channel spacing between the VCO output frequencies can be maintained. Moreover, the fractional division function of the present invention has been described in conjunction with the use of a sample and hold circuit, the latter which serves to filter the discriminator output and reduce the filtering requirements within the phase-locked loop. However, other types of filters can be used that reduce the A.C. energy to an acceptable level. It will undoubtedly become apparent to those skilled in the art, that other modifications and substitutions can be made that do not depart from the true scope of the invention as defined in the appended claims.

What is claimed is:

1. A fractional divider for performing, in response to a first series of pulses applied to its input, a sequence of divisions of the frequency of said first series of pulses by a series of whole number factors to produce a second series of pulses at its output in response thereto, said series of whole number factors being selected to produce an average frequency of said second series of pulses less than said frequency of said first series of pulses by said factor when averaged over said sequence of divisions, said divider comprising:

counter means for producing a divider output pulse in response to a number of said pulses in said first series applied to its input equal to the smallest of said whole number factors in said series of whole number factors and logic means coupled between the output of said divider and the input of said counter means and responsive to said divider output pulses for withholding, for each of said divisions by said series of whole number factors greater than said smallest whole number factor, a number of said pulses within said first series of pulses from said counter input equal to the difference between the whole number factor of said division and said smallest whole number factor;

said logic means comprising:

first means for producing a signal in response to each of said divider output pulses representative of divisions by a whole number factor greater than said smallest whole number, and second means connected between said divider input and said counter input for withholding said pulses within said first series of pulses from said counter input in response to said signal.

2. A system according to claim 1 wherein said second means comprises a plurality of serially connected gates at least equal in number to the difference between the largest and the smallest of said whole number factors, the number of said gates responsive to said control signal being equal to the difference in the whole number factor of said division within said sequence of divisions and said smallest whole number.

3. A system according to claim 1 wherein said first means comprises third means coupled to said divider output for counting said divider output pulses, and fourth means connected between said third means and said second means for monitoring the count in said third means and cooperating therewith for producing said signal.

4. A system according to claim 1 wherein said second means is closed responsive to said signal and opened responsive to number of said pulses within said first series of pulses equal to said difference.

5. A system according to claim 2 wherein each of said gates responsive to said signal is closed thereby, and each of said gates, when closed, is opened by a pulse within said first series of pulses occurring at the input of said closed gate.

6. A fractional divider for performing, in response to a first series of pulses applied to its input, a sequence of divisions of the frequency of said first series of pulses by a series of whole number factors to produce a second series of pulses at its output in response thereto, said series of whole number factors being selected to produce an average frequency of said second series of pulses less than said frequency of said first series of pulses by said factor when averaged over said sequence of divisions, said divider comprising:

counter means for producing a divider output pulse in response to a number of said pulses in said first series applied to its input equal to the smallest of said whole number factors in said series of whole number factors and logic means coupled between the output of said divider and the input of said counter means and responsive to said divider output pulses for withholding, for each of said divisions by said series of whole number factors greater than said smallest whole number factor, a number of said pulses within said first series of pulses from said counter input equal to the difference between the whole number factor of said division and said smallest whole number factor;

said counter means comprising:

selector means for selecting said smallest whole number factor from a plurality of whole numbers.

7. A system according to claim 6 wherein said counter means includes a first selector means for selecting said smallest whole number factor from a plurality of whole number, and said logic means includes a second selector means for selecting the number of said pulses within said first series of pulses to be withheld from said input of said counter means and the sequence thereof.

8. A system according to claim 6 wherein said counter means comprises a plurality of serially connected decade counters.

References Cited

UNITED STATES PATENTS 3,189,832 6/1965 Pugh ---------------- 328—42

ARTHUR GAUSS, *Primary Examiner.*

S. D. MILLER, *Assistant Examiner.*